June 4, 1940.　　　C. F. JOHNSTON　　　2,203,154
PISTON RING
Filed March 5, 1937
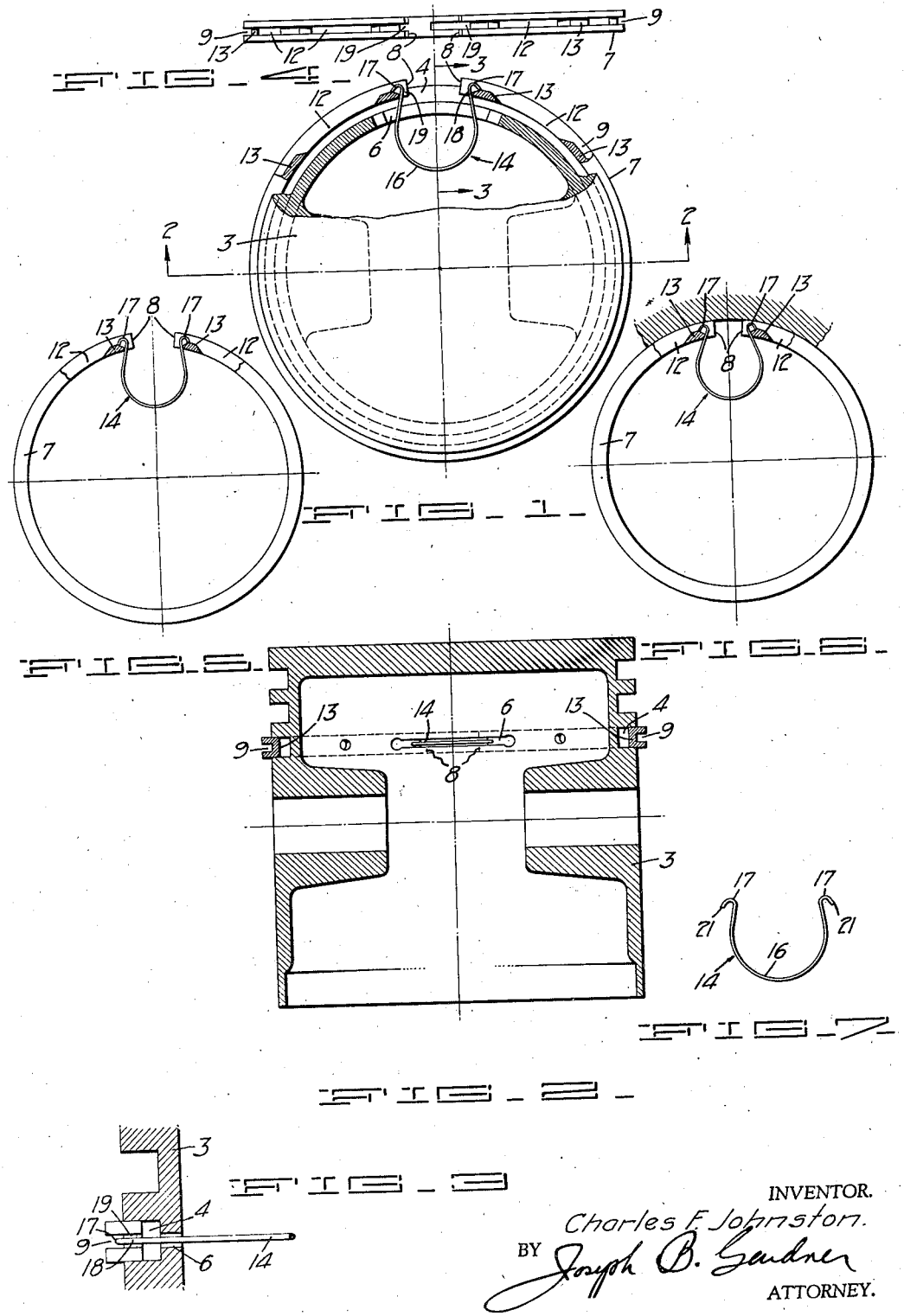
INVENTOR.
Charles F. Johnston.
BY Joseph B. Gardner
ATTORNEY.

Patented June 4, 1940

2,203,154

UNITED STATES PATENT OFFICE 2,203,154

PISTON RING

Charles F. Johnston, Oakland, Calif.

Application March 5, 1937, Serial No. 129,151

6 Claims. (Cl. 309—39)

The invention relates to improvements in piston rings both as regards the rings as units and as combined with pistons.

An object of the invention is to provide a means carried as a unitary part of the ring and coacting with the body of the ring in such a way that all portions thereof in engagement with the cylinder wall will be subjected to an equal flexure and will be pressed or expanded against said wall with a uniform radial pressure.

Another object of the invention is to provide a ring with the above feature which may be readily applied to conventional pistons without requiring modification of the design or mutilation of any of the portions of the piston.

A further object of the invention is to provide a ring of the character described in which the pressure exerted by the piston against the cylinder wall may be adjusted to any degree desired without subjecting any portion of the ring to undue strain or causing deformation of the ring and consequent uneven bearing of the ring against the walls.

Still another object of the invention is to provide a ring of the character described with an expansion member supported and carried exclusively by the ring and so formed and positioned thereon that accidental displacement of such means on the ring or the engagement of such means with the cylinder wall will be prevented.

Yet another object of the invention is to provide a ring of the character described with an auxiliary expansion means, the size and extent of which may be practically unlimited.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a top view of a piston partly in section and shown with the ring operatively positioned thereon.

Figure 2 is a vertical sectional view of a piston and ring taken on the plane of line 2—2 of Figure 1.

Figure 3 is an enlarged fragmentary vertical section of the piston and ring taken on the plane of line 3—3 of Figure 1.

Figure 4 is a side view of the ring.

Figure 5 is a view of the ring similar to that shown in Figure 1 but illustrating the ring unit as removed from the piston.

Figure 6 is a view similar to Figure 5 but showing the ring as operatively engaged with the cylinder walls.

Figure 7 is a side view of the expansion spring with which the piston is provided.

The ring of my invention in the embodiment here illustrated, is of the so-called oil ring type and is designed for use in a piston 3 having a ring groove 4 which is in communication with the interior of the piston through means of a slot 6 formed in the portion of the piston wall at the bottom of the groove. The slot 6 forms a passage for the oil, and in many types of conventional pistons, is elongated appreciably circumferentially with the groove. However, as will be readily apparent even in such cases where the slot is not provided it may be readily cut in the wall without causing mutilation of the piston or in any way impairing its normal function.

The ring, as will be clear from the drawing, comprises an annular extendible expandable body 7 which is split so as to define ends 8 here shown in spaced circumferential opposition. On the outer periphery of the ring is provided an annular groove 9 which communicates with spaces 12 which extend through the ring to the inner periphery and are defined between the integral bridge portions 13 of the ring.

Means is provided which is designed to be carried by the ring so as to form a unitary part thereof for furnishing or augmenting the expansive action of the ring. This means, in the present embodiment, is in the form of a spring 14, operatively interposed between the ends of the ring and serving to increase the diameter of or expand the ring by resiliently pressing the ends apart in circumferential direction. The spring 14, as will be clear from Figures 1 and 7, is in the form of a loop 16 whose ends 17 are detachably connected with the ends 8 of the ring. The spring at intermediate portions 18 seats within notches 19 which are formed by bifurcating the ends of the ring, the portions 18 bearing against the base of the notches whereby the ring ends 8 may be urged apart. Projecting from the portions 18 are laterally extending extremities 21 which seat upon the bridges 13 at the bottom of the groove 9. It will be noted that the portions 17 and the extremities 21 by reason of their engagement in the notches 19 and in the groove 9, will be prevented from being displaced axially of the ring and at the same time the spring will serve to urge the ends in circumferential alignment, and prevent so-called ring flutter.

The loop portion 16 of the spring extends through the passage 6 and into the interior of the piston. This arrangement is of considerable importance as it permits the spring to be made of practically any design and of almost any length, the interior of the piston providing practically the only limitation as to such shape and length. It will be evident that with the spring thus formed and arranged the ends of the ring may be readily and effectively pressed apart to increase or provide for the desired resiliency of the ring, and it will be noted that since the entire body of the ring is clearly flexible the increased resiliency of the ring will be distributed evenly throughout the entire circumferential length of the ring. This uniform flexure of the ring permits of the ring being formed of more flexible material than heretofore, and thus not only is it possible to provide an even distribution of the expanding presure around the ring, but the latter will more readily conform to any inequalities in the cylinder wall.

As can be clearly seen, the spring can be removed from or replaced on the ring with extreme readiness, the spring being inserted from the outer periphery of the ring, while it may be easily removed by engagement from the inside. It is important to note that when the spring is operatively disposed in the ring the sides of the loop diverge as the loop projection from the ring, and by reason of this, accidental removal or outward displacement of the spring in the ring is effectively prevented. It will also be noted that the greater the contraction of the ring the more effectively will the extremities of the spring be retained against their seats.

Where, as in the present embodiment, the invention is incorporated in an oil ring no appreciable heat will be conducted through the spring since the spring is in direct communication with the oil inside the piston and is thereby kept relatively cool. Furthermore, since the spring is loosely disposed in the slot 6 accumulation of carbon in such slot will not be permitted.

I claim:

1. A piston ring comprising, a split annular body flexible substantially throughout its length and having recesses in the ends of the body formed by contiguous depressions in the end and outer faces of such ends, and an expansion spring having a body portion in the form of a loop extending transversely into the area defined by the inner periphery of the body and having at the ends thereof intermediate portions releasably engaging in the part of said depressions formed in said end faces and end portions releasably engaging in the part of said depressions formed in said outer faces.

2. The combination with a piston having a ring groove and a passage for oil provided in the piston wall between said groove and the interior of the piston, a split piston-ring seated in said groove and having its ends in circumferential opposition, and an expansion spring having a loop portion extending through said passage and into the interior of the piston and having at each of the ends of the loop a portion interlocking with the ends of the ring and in such manner that the ends of the spring will be maintained against displacement axially of the ring.

3. A piston ring comprising a split annular member formed with radial grooves in the end faces thereof and contiguous circumferential grooves in the outer periphery thereof, and an expansion spring having a body portion in the form of a loop extending transversely into the interior of the ring and having end portions seated in said grooves and locked therein against radial inward and circumferential displacement relative to said ring ends.

4. A piston ring comprising, a split annular member formed with radial grooves in the end faces thereof and contiguous circumferential grooves in the outer periphery thereof, and an expansion spring having a body portion in the form of a loop extending transversely into the interior of the ring and portions adjacent the ends thereof seated in said radial grooves with the ends thereof bent outwardly to seat in said circumferential grooves to thereby retain said spring ends against radial inward displacement and circumferential displacement relative to said ring ends.

5. The combination with a piston having a ring groove and a circumferentially elongated slot in the piston wall communicating said groove and the interior of the piston, a split piston ring seated in said groove and having its ends in circumferential opposition, and an expansion spring having a loop portion mounted in said slot with the body of the loop extending into the interior of said piston and formed at its outer free ends with reversely related hooks opening to and engaging said ring ends to expand said ring.

6. The combination with a piston having a ring groove and a passage for oil provided in the piston wall between said groove and the interior of the piston, a split piston ring seated in said groove and having its ends in circumferential opposition, said ring ends being formed with contiguous radial and circumferential grooves, and an expansion spring having a loop portion mounted in said passage and formed with hook shaped free ends seated in said radial and circumferential grooves to retain said spring ends against radial inward displacement and circumferential displacement relative to said ring ends.

CHARLES F. JOHNSTON.